United States Patent
Gleich

[11] 3,921,411
[45] Nov. 25, 1975

[54] C₂ SPLITTER OPERATION WITH SIDE DRAW REMOVAL OF WATER TO PREVENT HYDRATE FORMATION

[75] Inventor: Walter A. Gleich, Pasadena, Tex.

[73] Assignee: Shell Oil Company, Houston, Tex.

[22] Filed: Oct. 23, 1974

[21] Appl. No.: 517,119

Related U.S. Application Data

[63] Continuation-in-part of Ser. No. 334,324, Feb. 21, 1973, abandoned.

[52] U.S. Cl. .......................... 62/18; 203/41; 55/35; 55/29
[51] Int. Cl.² ........................................... F25J 3/00
[58] Field of Search ............... 62/13, 14, 15, 17, 18, 62/23, 24, 27, 28, 29, 33, 41, 12; 203/41, 68; 202/176; 55/35, 29; 260/676 H

[56] References Cited
UNITED STATES PATENTS

| | | | |
|---|---|---|---|
| 2,498,806 | 2/1950 | Hachmuth | 62/27 |
| 2,600,110 | 6/1952 | Hachmuth | 62/28 |
| 2,953,905 | 9/1960 | Chrones et al. | 55/29 |
| 2,974,102 | 3/1961 | Williams | 62/58 |
| 3,485,886 | 12/1969 | Mitchell et al. | 62/28 |

Primary Examiner—Norman Yudkoff
Assistant Examiner—Frank Sever

[57] ABSTRACT

A continuous distillation process for recovering ethylene from an ethane-ethylene mixture containing small quantities of soluble water whereby hydrate formation is prevented in the distillation zone by removing a side draw at a point in the distillation zone where the dissolved water concentration is substantially at a maximum, passing this side draw through a drying zone to substantially remove the contained water, and returning the dried side draw to the distillation zone. The water concentration in the distillation zone is thus controlled and maintained below the level at which hydrate formation occurs.

5 Claims, 2 Drawing Figures

C₂-SPLITTER OPERATION WITH SIDE DRAW REMOVAL OF WATER TO PREVENT HYDRATE FORMATION

This application is a continuation-in-part of applicant's copending application Ser. No. 334,324, filed Feb. 21, 1973, now abandoned.

BACKGROUND OF THE INVENTION

1. Field of the Invention

This invention relates to an improved method of separating hydrocarbons. More particularly, it relates to a method of separating ethylene from ethane in hydrocarbon mixtures containing soluble water in a manner such that hydrate formation is minimized or eliminated.

2. Description of the Prior Art

Ethylene, an unsaturated hydrocarbon, used as a reactant in the production of a great number of products, is a hydrocarbon of great commercial importance. It is produced by a number of processes. For example, ethylene is produced from more saturated hydrocarbons, e.g., by the pyrolysis of ethane or heavier hydrocarbons, such as propane, butane, naphthas, and gas oils wherein ethylene is one of many products formed. Common to all of these processes is the production of ethylene in admixture with ethane and other hydrocarbons. From such mixtures ethylene is recovered in the purity required for commercial uses by employing a number of distillation stages. There are a number of processing schemes which may be employed to effect the separation of the hydrocarbon mixture into the various fractions.

In one processing arrangement, the hydrocarbon mixture is subjected to a distillation zone (demethanizer) wherein methane and lighter gases are recovered as an overhead product. The bottoms from this distillation zone is then subjected to a second distillation zone (deethanizer) wherein the $C_3$ and heavier hydrocarbon are recovered as a bottoms product. The overhead from this deethanizer, containing ethane and ethylene along with a small amount of methane and $C_3$ hydrocarbons, is then subjected to a distillation zone wherein ethylene is recovered as a product. Such a distillation zone is referred to as a "$C_2$-Splitter".

In another processing arrangement the hydrocarbon mixture is subjected to a demethanizer to recover methane and lighter materials as an overhead product and the bottoms from the demethanizer is feed to a $C_2$-splitter. In this $C_2$-splitter ethylene and lighter materials are recovered as overhead products and ethane and heavier hydrocarbons are recovered as bottoms product.

In still another processing arrangement, the hydrocarbon mixture is initially subjected to a distillation zone (deethanizer) wherein the $C_3$ and heavier hydrocarbons are recovered as a bottoms product and the ethane and lighter hydrocarbons are recovered as an overhead product. This overhead product is then fed to a demethanizer wherein methane and lighter materials are recovered as overhead products. The bottoms from this demethanizer, containing predominantly ethane and ethylene, is then fed to a $C_2$-splitter whereby ethylene is recovered as an overhead product. There are other possible processing arrangements which may be employed as will be apparent to one skilled in this art. The particular processing arrangement employed will depend in part upon the ethylene feedstock and the process requirements for the various fractions present.

Common to all of these processing arrangements is the distillation zone ($C_2$-splitter) wherein the separation of ethylene and ethane is effected. This distillation generally requires refrigeration and all or a large portion of the distillation zone is at a temperature which is conducive to hydrate formation.

Hydrates are insoluble solids which form as a result of reaction of free water with hydrocarbons at low temperatures. In order for hydrates to form, water must be present as a separate phase. Therefore, in carrying out the distillation in the $C_2$-splitter, the presence of free water is to be avoided. Otherwise, the insoluble hydrates are deposited on the distillation column trays and in the downcomers with the result that the column capacity and fractionation efficiency are reduced if not substantially impaired. Although preventive measures are incorporated in the design of $C_2$-splitter distillation systems to reduce the water concentration of a $C_2$-splitter feed, e.g., feed dryers are employed to remove water in the $C_2$-splitter feed down to levels as low as 0.05 ppm w – 1.0 ppm w, there is nevertheless a problem with water accumulation in the $C_2$-splitter with consequent hydrate formation. Hydrate formation occurs because all the water in the feed is not removed in the product streams. Water in the lower section of the column tends to distill upward from the bottom of the column towards the feed tray while the water in the upper section of the distillation column tends to distill downwards toward and below the feed tray. This phenomenon causes a bulging of the soluble water profile in the column at a point intermediate between the bottom of the column and the feed tray. The soluble water concentration in the column continues to increase until a separate phase is formed and hydrates are produced.

There are several approaches practiced in the art for combatting this problem, all of which are unsatisfactory due either to the impairment of the performance of the $C_2$-splitter or to the effect on the overall ethylene recovery process. One approach — the least satisfactory of all — is that of periodically shutting down the $C_2$-splitter and washing the column with an appropriate solvent, e.g. an alcohol, to remove the accumulated hydrates. This method has the disadvantage that the entire plant has to be shut down for several days, with the ensuing loss of production. This method is still employed, however, because the shortcomings of the other methods make this one necessary on occasion.

Another method for combatting hydrate formation involves the periodic flushing of the $C_2$-splitter with an appropriate wash solution. In this manner a complete shut down of the $C_2$-splitter is not required; however, its operation is substantially interrupted with consequent loss of throughput. The flushing is effected by injecting a large slug of alcohol or other appropriate solvent into the reflux or feed to the splitter for a short interval of time. During this washing period, $C_2$-splitter operations are not normal. The column is typically on total reflux and no product is being recovered, or alternatively, the column is operated at reduced throughput during this flushing. After the washing is completed, several hours are required to reestablish normal operating conditions. An additional disadvantage of this method is that the flush solution, e.g., generally methanol, which is withdrawn with the bottoms product can have adverse effects on downstream operations.

Still another method of dealing with the problem of hydrate formation involves the continuous addition of a small amount of alcohol to the $C_2$-splitter. The alcohol flowing down through the column removes water from the column in solution with the alcohol and is thereby removed in the bottoms product. Although preferable to either of the preceding methods, continuous alcohol injection has several disadvantages. In the amounts which are practical, e.g. 1–2% by weight, the continuous alcohol addition is not very effective in preventing hydrate formation. Moreover, there is the added disadvantage of a loss of capacity for the $C_2$ hydrocarbons being distilled, and the problems related to recovering the alcohol and reconcentrating it for re-use. Finally, there are problems resulting from the alcohol in the ethane bottoms product. This can cause problems in the downstream operations such as recycle ethane vaporization and recycle ethane pyrolysis.

Still another method for combatting hydrate formation involves periodically dumping the accumulated dissolved water from the system by decreasing the bottoms temperature of the $C_2$-splitter and forcing additional ethylene and water out the bottom of the column. This method has the disadvantage of loss of ethylene product and results in the recycle of excessive amounts of ethylene to the pyrolysis furnaces.

It would be advantageous to have a distillation process for the separation of ethylene from ethane and other fractions in which hydrate formation is reduced or eliminated. It would also be advantageous to have a process for separating $C_2$ fractions which provided means for preventing the accumulation of water within the system to levels where hydrate formation occurs. It would also be an advantage to provide a process for continuous operation of the $C_2$-splitter which does not require either the use of materials extraneous to the process in order to prevent or control hydrate formation or operating the column under abnormal conditions to reject water from the system.

SUMMARY OF THE INVENTION

It has now been found that in a low temperature distillation of an ethane-ethylene containing hydrocarbon mixture additionally containing dissolved water in amounts of from 0.05 ppm w to about 50 ppm w in a distillation zone whereby ethylene is recovered in high purity, the formation of hydrocarbon hydrates and ice is avoided by continuously removing a side draw from a point in the distillation zone where the concentration of dissolved water is substantially at a maximum. The side draw is passed through a drying zone to produce an effluent stream with a reduced water content, which effluent stream is recycled to the distillation zone. By this method the solubility limit of water in the hydrocarbon mixture in the distillation zone is not exceeded, with the result that hydrate formation and ice formation do not occur.

DESCRIPTION OF THE PREFERRED EMBODIMENTS

Figure 1:
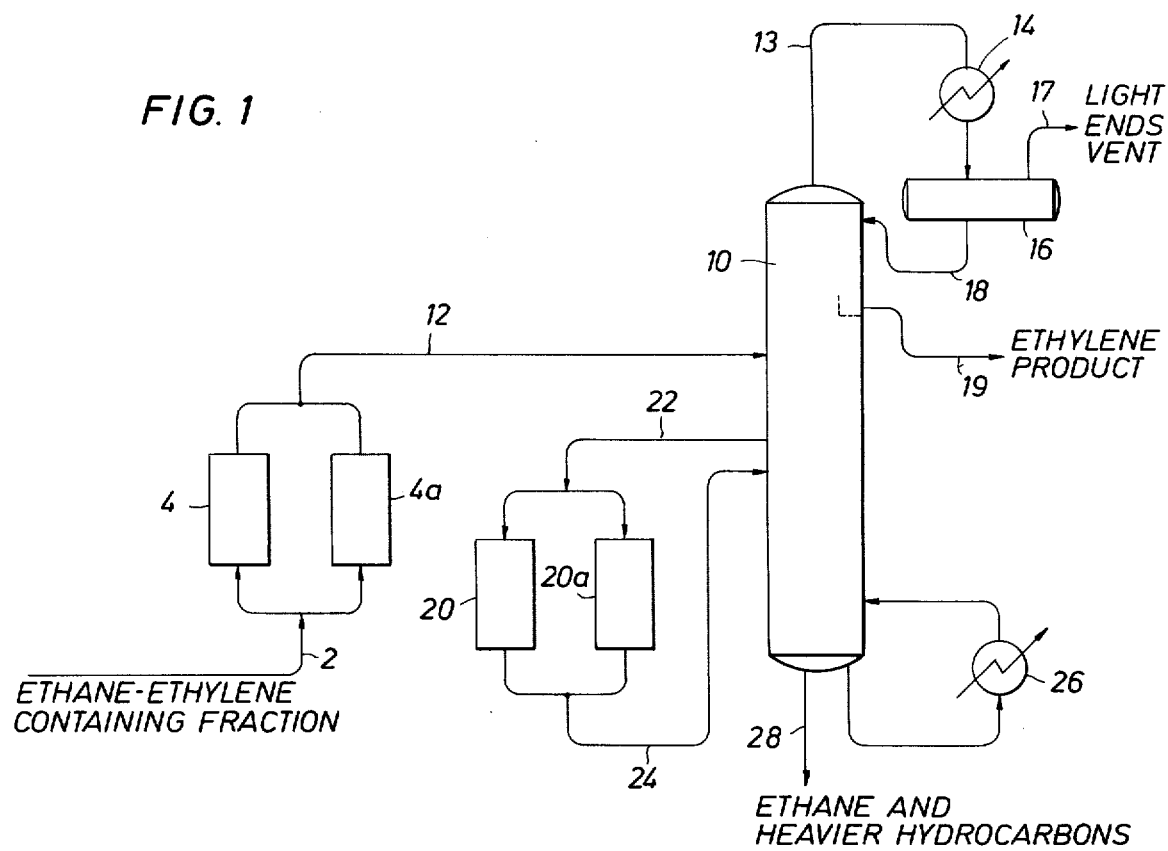
FIG. 1 represents a schematic flow diagram of a $C_2$-splitter process embodying a preferred modification of the invention.

The process according to the invention is characterized in that a hydrocarbon feedstock consisting primarily of ethane and ethylene with minor amounts of hydrogen, methane, acetylene, propylene, propane and dissolved water is subjected to a distillation step in which ethylene and hydrocarbons more volatile than ethylene are recovered as overhead fractions, while ethane and the less volatile hydrocarbons are recovered as a bottoms product. This distillation step is conducted in a distillation zone which is generally referred to as a $C_2$-splitter. The distillation is typically carried out at pressures of from about 50 psig to about 400 psig with pressures of from about 250 psig to about 350 psig being preferred. The optimum operating pressure will depend upon several factors, including feed composition and the degree of separation desired between ethane and ethylene. The operating temperatures in the $C_2$-splitter will reflect the operating pressure selected with temperatures of about 69°F in the bottoms and about −100°F in the overhead being typical for 50 psig operation and temperatures of about 50°F in the bottoms and about 5°F in the overhead being typical for 400 psig operation. Operating at a preferred pressure in the range of about 250 psig to about 350 psig, the operating temperatures will be from about 15°F to about 40°F in the bottoms and from about −30°F to about −5°F in the overhead. At these operating temperatures, a substantial portion of the $C_2$-splitter is at a temperature conducive to hydrate formation. Therefore, the distillation is carried out so that the concentration of dissolved water in the hydrocarbon mixture being distilled does not exceed the solubility limit for water at any point in the distillation zone. Even where the hydrocarbon feed mixture to the distillation zone is relatively dry, e.g., containing from about 0.05 ppm w to about 2.0 ppm w of water, which is well below the solubility limit for water in such hydrocarbon mixtures under typical operating conditions, the water nevertheless causes problems because of the concentrating effect in the distillation zone at a point intermediate between the point at which the feed mixture is introduced to the zone and the bottom of the zone.

In accordance with the instant invention, a side draw is removed at a point in the zone where the dissolved water concentration is substantially at a maximum and is passed through a drying zone whereby the water content of the side draw is substantially reduced. The location of the sidedraw relatively near the point of maximum water concentration is important, for if the sidedraw is located too high or too low in the column, hydrates eventually form in the column. Typically, the water content of the side draw after it has been dried is from about 0.05 ppm w to about 2.0 ppm w with a water content of from about 0.1 ppm w to about 1.0 ppm w being preferred. The dried side draw is then returned to the distillation zone. By this procedure, the water concentration in the distillation zone can be maintained below the solubility limit and ice and hydrate formation is thereby eliminated.

The point in the distillation zone at which the side draw is removed is determined experimentally by analyzing samples extracted from the zone at various locations for water content. In this manner, a concentration profile can be established. It has been found that for a given hydrocarbon feed composition and set of operating conditions, the point in the zone at which the water concentration is highest remains essentially unchanged. The magnitude of the water concentration at that point depends upon the water content of the feed mixture to the zone and the rate at which water is removed from the zone via the side draw and the bottoms product.

With dissolved water concentrations less than about 0.05 ppm w in the hydrocarbon feed to the $C_2$-splitter, the solubility limit of water in the hydrocarbon mixture will not be exceeded. Such small amounts of water will pass through the column and be removed in the bottoms product. However, at dissolved water concentrations greater than about 0.05 ppm w in the incoming feed to the $C_2$-splitter, water will concentrate in the distillation zone and will form a separate water phase with consequent ice and hydrate formation. Therefore, the side draw removal rate must be such that water is removed from the distillation zone at a rate at least equal to the rate at which water enters the zone. Consequently, the amount of water being withdrawn from the zone via the side draw drying zone must at least equal the amount of water entering the zone in the feed, less the small amount of water leaving the zone via the bottoms stream. It is estimated that when water in excess of 0.05 ppm weight is present in the typical $C_2$-splitter feed at the typical operating conditions shown in the specification that little or no water is removed with the top product and that only about 1% to about 25% of the water present in the feed is removed with the bottoms stream. If the rate of removal of water via the side draw and the bottoms stream is greater than the rate of input of water to the system, the water concentration profile in the zone will be reduced until there is again an equilibrium between water input and water outtake via the side draw drying zone and the bottoms stream. It is therefore possible to select the degree of dryness — that is, the maximum water concentration — for the zone by adjusting the side draw removal rate.

The side draw is either a liquid side draw or a vapor side draw, although a liquid side draw is generally preferred. With a liquid side draw the process requirements are simpler and the side draw dryer is more compact.

Ideally, the side draw after it has been dried is returned to the distillation zone at the equilibrium location. Generally, this means that the side draw is removed from one tray in the distillation column and is returned to an adjacent tray. However, this need not be the case. Since the side draw removal rate is generally quite small as compared with the total flow through the distillation zone, the dried side draw can be returned to the distillation zone at another point, e.g., a point higher or lower in the zone, with only a minimal effect on the overall fractionation efficiency and column capacity.

The drying agent employed in the drying zones, the feed dryer if employed and in the side draw dryer, is any of the conventional suitable dessicants, such as bauxite, alumina, silica gel, etc., or is a molecular sieve, which traps the contained water but allows the hydrocarbons to pass. Whatever drying agent is employed, it is generally desirable to provide such drying agent in two drying vessels. In this manner, it is possible to regenerate a dryer which has become saturated with water while continuing the operation of the dehydration of the distillation zone on a continuous basis. However, if the distillation zone is not operating near the dissolved water solubility limit and if the feed to the $C_2$-splitter is sufficiently dry, e.g., about 2.0 ppm w, then the dryer which requires regeneration can be taken offstream and regenerated before the water concentration in the distillation zone builds up to undesirable levels. As a result, it is practical to operate the $C_2$-splitter with only one drying vessel.

The regeneration of a dryer which has become saturated with water is accomplished in various conventional ways, some of which include heating, gas stripping, back flushing with a water miscible solvent, etc. The method selected to regenerate the dryer will depend in part upon the drying agent utilized.

The feed to the $C_2$-splitter can vary widely in composition depending upon the choice of feedstock in the ethylene process as well as the sequence selected to fractionate the crude ethylene-containing product into the desired fractions. Generally, as the proportion of ethane in the $C_2$-splitter feed relative to ethylene increases, the dissolved water concentration, at which the $C_2$-splitter can be continuously fed without the formation of a separate water phase, also increases. Typically, with ethane/ethylene ratios of from about 1:3 to about 3:1 in the $C_2$-splitter feed, a side draw dryer is required whenever the dissolved water concentration exceeds about 0.05 ppm w. In many ethylene recovery systems, the feed to the $C_2$-splitter has been previously dried to maintain a low dissolved water concentration, e.g., from about 0.05 ppm w to about 2.0 ppm w. However, the process of the instant invention is applicable whether or not the $C_2$-splitter feed has been previously dried. In fact, one advantage of the instant invention is that the upstream feed dryer can be eliminated if the feed does not have an extremely high concentration of dissolved water, e.g., no more than 50 ppm w. Whenever an upstream feed dryer is employed, the hydrocarbon mixture to be dried is dried either as a liquid or a gas and the flow through the dryer is either up-flow or down-flow, depending upon the design of the dryer. This is also true for the side draw dryer.

As mentioned previously, the feed to the $C_2$-splitter contains, in addition to ethane and ethylene, smaller quantities of hydrogen, methane, acetylene, propane and propylene. The amounts of these materials present in the $C_2$-splitter feed will depend upon the type of ethylene process as well as the upstream processing of the ethane-ethylene containing fraction prior to the $C_2$-splitter. If the concentration of hydrocarbons lighter than ethylene is very low, ethylene is recovered in a conventional manner as an overhead product from the $C_2$-splitter. However, generally there are sufficient concentrations of light ends present (hydrogen, methane, acetylene, etc.) such that ethylene is recovered in a pasteurizing section of the distillation zone. This pasteurizing section, from which the ethylene product is recovered, is located at a point between the feed tray and the overhead. The exact location will depend upon the composition of the feed to the $C_2$-splitter and the ethylene purity desired.

DESCRIPTION OF THE DRAWINGS

Figure 2:
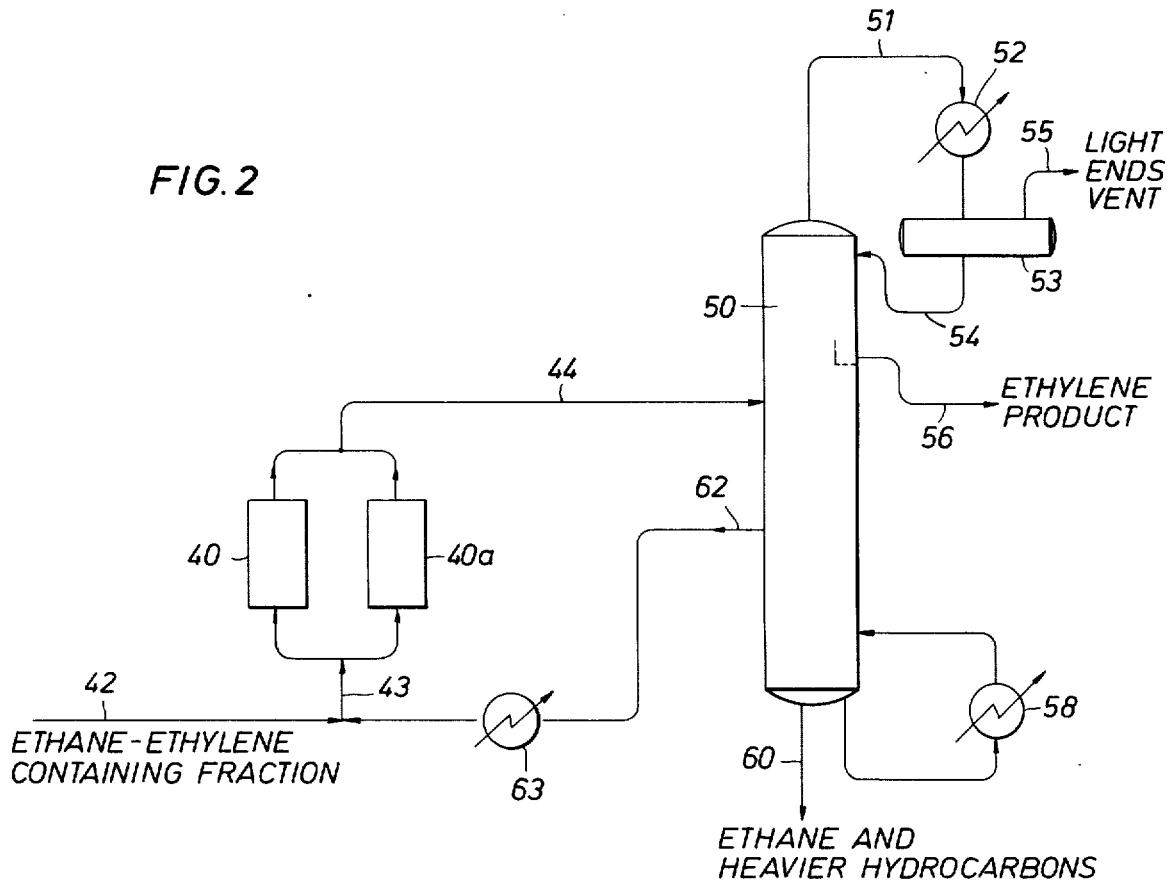
FIG. 2 represents a schematic flow diagram of a $C_2$-splitter process embodying an alternative embodiment of the invention.

FIGS. 1 and 2 show by way of example the flow schemes of different embodiments of the invention. It is understood that there are other embodiments of the invention as will be known to those skilled in the art and that the invention is not to be limited to the embodiments illustrated herein. Conventional processing equipment such as valves and the like are not illustrated as the location and nature of these will be apparent to one skilled in this art.

Referring to FIG. 1, a gaseous hydrocarbon mixture consisting primarily of ethane and ethylene with minor amounts of hydrogen, methane, acetylene, propylene, propane and water is introduced via line 2 to a feed dryer 4 or 4a wherein it is contacted with a drying agent whereby the water content of the hydrocarbon mixture is reduced to a level of about 0.05 ppm w to about 2.0 ppm w. The dried hydrocarbon mixture from the feed dryer is then carried via line 12 to an intermediate portion of a distillation zone 10 ($C_2$-splitter). In the distillation zone 10 the hydrocarbon mixture is fractionated to give ethylene and hydrocarbons more volatile than ethylene as an overhead product from the distillation zone 10 and ethane and the less volatile hydrocarbons as a bottoms product. The distillation is typically carried out at pressures in the range of from about 250 psig to about 350 psig and the operating temperatures in the distillation zone 10 are generally from about −30°F to about 40°F.

The overhead vapor from the distillation zone 10, containing predominantly ethylene with small amounts of methane, hydrogen and ethane is carried via line 13 to condenser 14 wherein the ethylene and ethane are condensed and are collected in accumulator 16. The light ends, e.g., hydrogen and methane, are vented from the accumulator 16 via line 17. The liquid from the accumulator, containing essentially ethylene and a very small amount of ethane is returned via line 18 to the top of the distillation zone 10 as reflux. Ethylene is recovered from a pasteurizing section in the distillation zone 10 as reflux. Ethylene is recovered from a pasteurizing section in the distillation zone 10 via line 19. A side draw is removed via line 22 at a point in the zone where the dissolved water concentration is substantially at a maximum and is passed through a dryer 20 or 20a whereby the water content of the side draw is substantially reduced. The effluent from the drying zone is then returned via line 24 to the distillation zone 10. The bottoms product from the distillation zone 10 containing ethane and heavier hydrocarbons (including small amounts of ethylene and water) is recovered via line 28. The thermal energy required for the distillation is supplied via reboiler 26 attached conventionally to the bottom of the distillation zone 10.

FIG. 2 represents a modification of the instant invention wherein advantage is taken of the feed dryer to the $C_2$-splitter and as a result the desired water removal is accomplished without a separate dryer for the side draw. The gaseous hydrocarbon feed mixture carried out by line 42 is combined with the side draw carried by line 62 and the mixture is introduced via line 43 to the feed dryer 40 or 40a. The effluent from the drying zone is carried via line 44 to an intermediate portion of a distillation zone 50. In the distillation zone 50, the hydrocarbon mixture is fractionated to give ethylene and hydrocarbons more volatile than ethylene as an overhead product and ethane and the less volatile hydrocarbons as a bottoms product. The overhead vapor from the distillation zone 50 is carried via line 51 to condenser 52 wherein it is partially condensed and the products collected in accumulator 53. The liquid product from the accumulator 53 is returned to the distillation zone 50 via line 54 to provide reflux for the distillation. The light ends are vented from the accumulator 53 via line 55. Ethylene is recovered from a pasteurizing section in the distillation zone 10 via line 56. The thermal energy for the distillation is supplied via reboiler 58 and the bottoms product containing ethane and heavier hydrocarbons, is recovered via line 60.

The side draw is removed from the distillation zone 59 via line 62. However, in this modification of the invention, the side draw removed via line 62 is combined with the $C_2$-splitter hydrocarbon feed mixture of line 42 and the mixture is dried in feed dryer 40 or 40a. Whenever the side draw withdrawn via line 62 is a liquid, it is vaporized in vaporizer 63 prior to combination with feed mixture carried via line 42. This vaporizer is omitted whenever the side draw is a vapor or whenever there is sufficient superheat in the $C_2$-splitter feed mixture to vaporize the side draw. The advantage of this arrangement is that the water removal function for both the feed mixture and the side draw is accomplished with only one set of dryers. Employing this modification of the invention does, however, result in a small loss in fractionating capacity and efficiency due to the side draw being returned to the distillation zone 50 at the feed tray location instead of near the equilibrium position from which it was withdrawn in the zone. However, since the size of the side draw removed via line 62 is small in comparison to the feed stream carried via line 42 the adverse effect on the fractionating efficiency and column capacity is small.

EXAMPLE 1

The following example illustrates the employment of this invention as shown in FIG. 1, in the separation of an ethane-ethylene mixture containing minor amounts of methane, propane, propylene and water. An ethane-ethylene feed mixture is obtained from the overhead of a deethanizer employed in the recovery of gaseous product in an ethylene process in which gas oil, naphtha and ethane feedstocks are thermally cracked to lighter hydrocarbon products. The ethane-ethylene containing feed mixture is fed at a rate of 14,171 moles per hour to tray 32 of a distillation column containing 124 trays.

The column is operated with an overhead temperature of −18°F and a bottoms temperature of 24°F. The feed mixture is introduced as a vapor at a temperature of 13°F. The overhead pressure is 299 psia and the bottoms pressure was 312 psia. A liquid side draw is removed from tray 19 and is passed through a separate dryer containing mole sieves as a drying agent. The dried side draw is then returned to the column at tray 18. The following Table 1 presents the typical rates and compositions of the various streams.

TABLE I

|  | Feed Mole/Hr | Overhead Product Mole/Hr | Bottom Product Mole/Hr | Side Draw To Dryer Mole/Hr | Side Draw Return Mole/Hr |
|---|---|---|---|---|---|
| Methane | 2.2 | 2.2 | — | — | — |
| Ethane | 4139.8 | 3.5 | 4136.3 | 327.4 | 327.4 |
| Ethylene | 10.000.0 | 9955.7 | 44.3 | 154.0 | 154.0 |
| Propane & Propylene | 29.5 | — | 29.5 | — | — |
| Water | 0.04434 | — | 0.00042 | 0.04441 | 0.00049 |
| (p.p.m. mole) | (3.1) | — | (0.1) | (92.2) | (1.0) |

By this method, the column is operated continuously without hydrate formation and without addition of alcohol.

EXAMPLE 2

The following example illustrates the employment of this invention as shown in FIG. 2 in the separation of an ethane-ethylene mixture containing minor amounts of methane, propane, propylene, and water. The ethane-ethylene feed mixture was obtained from the overhead of a deethanizer employed in the recovery of gaseous product in an ethylene process in which a gas oil feedstock is thermally cracked to lighter hydrocarbon products.

The column was operated with an overhead temperature of −18°F and a bottoms temperature of 23°F. The feed mixture was introduced as a vapor at a temperature of 23°F. The overhead pressure was 300 psia and the bottoms pressure was 315 psia. A liquid side draw was removed from tray 19 and was passed through the feed dryer containing mole sieves as a drying agent. The dried side draw was then returned to the column at tray 27. When the hydrocarbon feed mixture is fed at the rate of 12,115 moles per hour to tray 27 of a distillation column containing 108 trays, the following data presented in Table II are typical of the rates and compositions of the various streams.

TABLE II

|  | Feed Mole/Hr | Overhead Product Mole/Hr | Bottom Product Mole/Hr | Side Draw To Dryer Mole/Hr | Side Draw Return Mole/Hr |
|---|---|---|---|---|---|
| Methane | 5.1 | 5.1 | — | — | — |
| Ethane | 2091.6 | 5.5 | 2086.1 | 138.3 | 138.3 |
| Ethylene | 10,000.0 | 9977.2 | 22.8 | 65.9 | 65.9 |
| Propane & Propylene | 18.3 | — | 18.3 | — | — |
| Water | 0.00376 | — | 0.00002 | 0.00380 | 0.00006 |
| (p.p.m. mole) | (0.31) | — | (0.01) | (18.6) | (0.31) |

By this method, a column was operated continuously without hydrate formation and without addition of alcohol.

I claim as my invention:

1. In a continuous distillation process for recovering ethylene comprising introducing into a distillation zone a $C_2$ hydrocarbon fraction consisting essentially of ethane and ethylene and additionally containing from about 0.05 ppm weight to about 50 ppm weight soluble water, the improvement which comprises:
   a. removing as a side draw a portion of the hydrocarbon and water from said distillation zone at a point intermediate between the point at which the feed mixture is introduced to said zone and the bottom of the zone;
   b. passing said side draw through a drying zone; and
   c. returning the effluent from said drying zone to said distillation zone, whereby the distillation zone is continuously operated without substantial hydrate formation and ethane is removed as a bottoms product substantially free from non-hydrocarbons.

2. The process of claim 1 wherein said side draw is removed from said distillation zone at a point where the water concentration is substantially a maximum.

3. The process of claim 2 wherein the water concentration of the effluent from said drying zone is from about 0.05 ppm weight to about 2 ppm weight.

4. The process of claim 1 wherein the water removed via said side draw is equal or greater than the water introduced to said distillation zone.

5. The process of claim 1 wherein the side draw from said distillation zone is combined with fresh feed to the drying zone.

* * * * *